United States Patent [19]
Koss

[11] 4,123,113
[45] Oct. 31, 1978

[54] GAS TABLE

[75] Inventor: George A. Koss, Dearborn Heights, Mich.

[73] Assignee: Ford Motor Company, Dearborn, Mich.

[21] Appl. No.: 836,623

[22] Filed: Sep. 26, 1977

[51] Int. Cl.² ............................................. B65G 51/02
[52] U.S. Cl. ..................................... 302/2 R; 302/31; 302/66
[58] Field of Search ..................... 302/2 R, 29, 31, 66; 214/1 BE; 271/195, 236; 65/25 A, 182 A

[56] References Cited
U.S. PATENT DOCUMENTS

| | | | |
|---|---|---|---|
| 2,678,237 | 5/1954 | Allander et al. | 302/31 |
| 3,866,906 | 2/1975 | Berry | 271/195 |

*Primary Examiner*—Evon C. Blunk
*Assistant Examiner*—Jeffrey V. Nase

*Attorney, Agent, or Firm*—William E. Johnson; Keith L. Zerschling

[57] ABSTRACT

A method is disclosed for moving an object which is floatable on a cushion of gas from a first station to a second station. A porous table over which the object is moved is divided into a plurality of zones of gas flow. Contiguous gas zones can have the same amount of gas flowing therethrough thereby to define areas of gas flow. The areas of gas flow are never larger than the object being moved thereover. The areas of gas flow have different amounts of gas flow with the largest occuring at the first station and the lowest at the second station. When an object is placed at the first station, it is supported on areas having two different amounts of gas flow. This causes the object to tip front end downwardly in the area of lowest gas flow and thereby be moved over the porous table member eventually to the second station. The specification also teaches a method for moving an object from any one of a plurality of first stations to a single second station.

12 Claims, 12 Drawing Figures

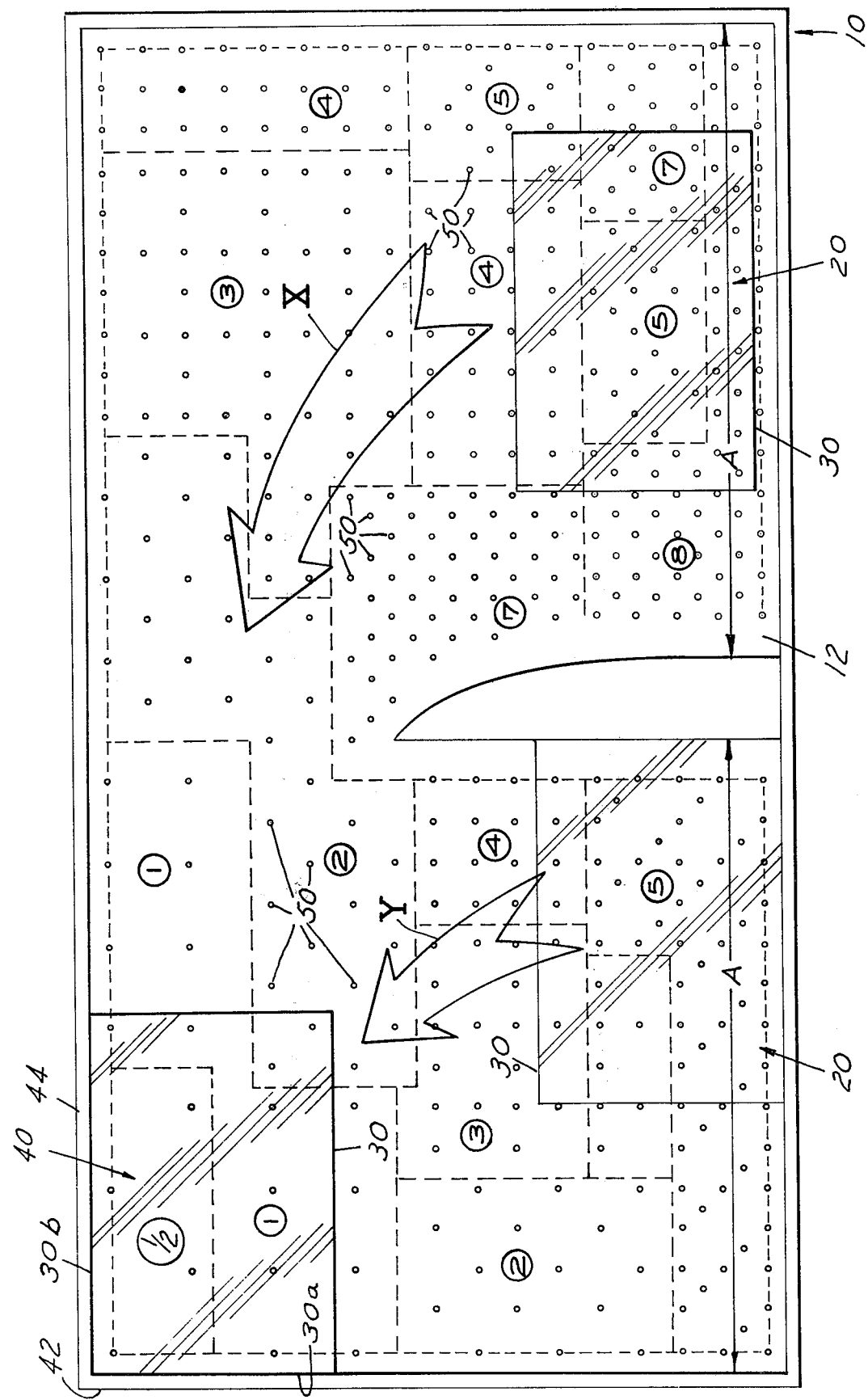

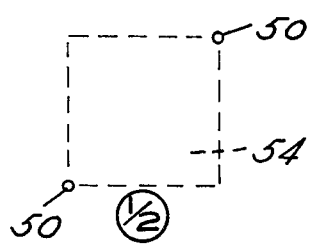
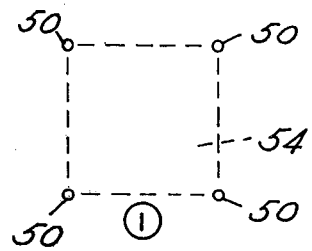
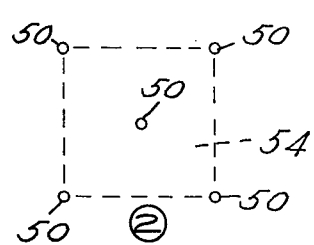
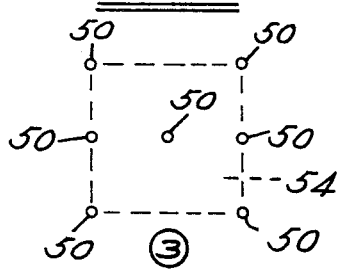
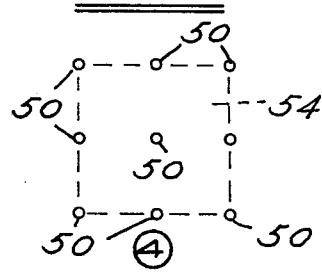
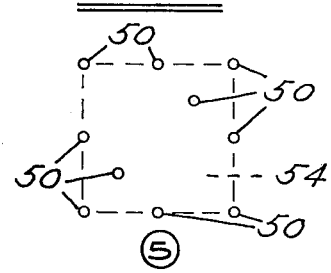
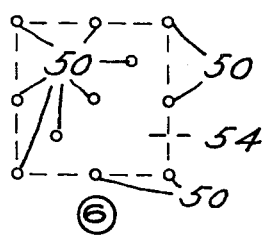
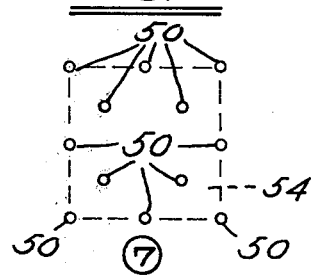
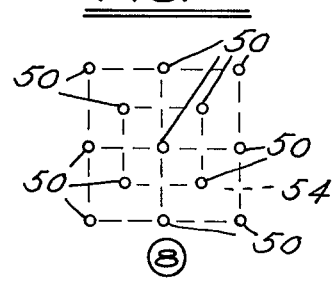
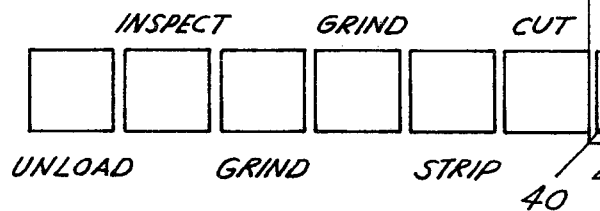
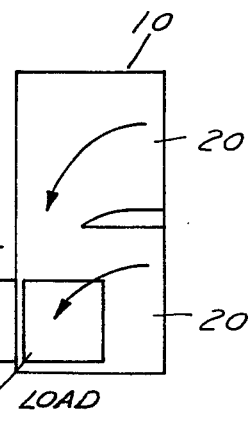

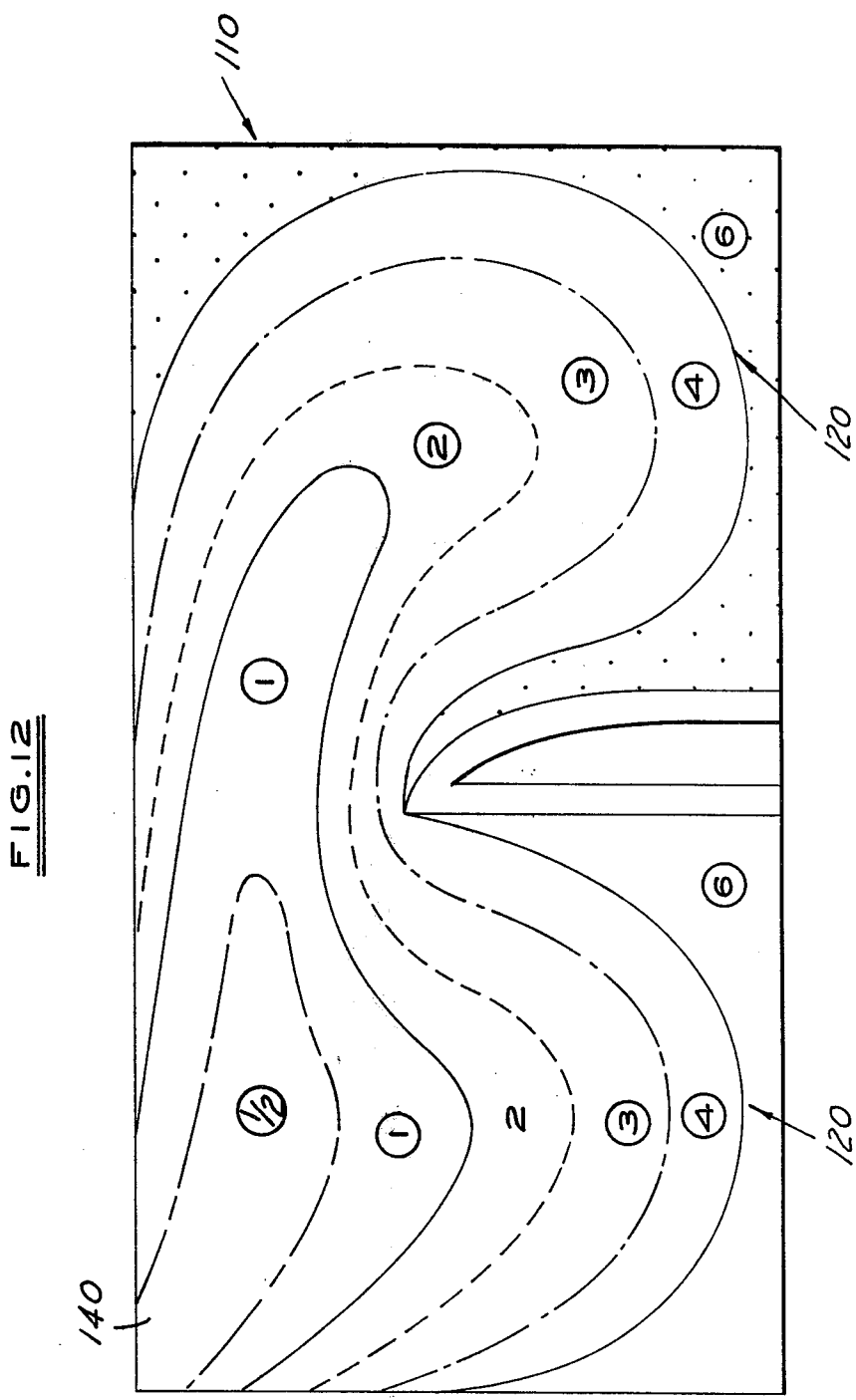

GAS TABLE

BACKGROUND OF THE INVENTION

In today's technology for fabricating automotive glass parts such as side lites and back lites, the glass brackets to be used in the fabrication of such parts are received in large wooden crates or metal containers in which individual glass brackets are stood on edge laying one against the other with as many as one hundred or more brackets in a single crate. These brackets are not located relative to one another except along their bottom edge. In other words, there is no common XY locating position for the plurality of brackets packed in a single crate.

Because of the failure to have the individual brackets in a crate located relative to one another in both the X and the Y dimensions, it is necessary to manually unpack these brackets and have the unpacker carefully place each bracket in a fixture upon which proper XY location of the individual glass bracket may be achieved. Use of an operator for accomplishing this manual transfer and locating of the glass bracket is, of course, an expensive operation. The operation is also a tedious one because of its repetitive nature and thus tends to be boring to the operator.

I have attempted over the years to design automated equipment for unpacking and accurately loading glass brackets which have been packed on edge in wooden crates. I have not been very successful in my endeavors because of the fact that the brackets boxed in such a manner are not aligned in both the X and the Y directions. In order to adjust for this mis-alignment, the handling equipment is unnecessarily complex and, therefore, costly to build. Also, because of the complexity of the equipment, the service time required for unit of serviceable life is also quite high.

I have now decided that the best approach is to break the uncrating and the locating of the glass bracket into two separate but simple operations. I can design quite simply an unloader device which is necessary to remove glass brackets from a crate, which device needs locate only off of the one edge engaging the bottom of the crate. This application is not directed to such a simple machine because such is well within the skill of those knowledgeable in the glass handling arts.

The device and method of this invention is a method which takes the uncrated glass bracket and moves it to a precise position in which X and Y coordinates are accurately located for the glass bracket. Thereafter, another glass handling apparatus may pick the located bracket up and move it into engagement with further glass processing equipment.

It is a principal object of my invention to provide a method for moving objects floatable on a gas stream from one of a plurality of first stations to a second station. The second station is a station which gives an accurate location of at least two dimensions on the object moved thereto.

It is another object of my invention to provide a method for moving glass brackets from one of a plurality of first work stations to a second work station at which at least two edges of the bracket are accurately located.

It is still another object of my invention to provide a method such as described above which is simple and easy to operate and which may be used to convey objects of various sizes, shapes and configurations.

SUMMARY OF THE INVENTION

The method of this invention relates to a method for moving an object and, more particularly, to a method of moving an object which is floatable on a cushion of gas from a first station to a second station.

In accordance with the teachings of this invention, a method for moving an object includes the following steps. A plurality of zones of gas flow are established by passing a gas upwardly through a porous table member. The amount of gas flow in each gas flow zone is controlled by the porosity of the zone of the table member. The greater the porosity of the zone, the greater the amount of gas flow in that zone of the table member. The zones of the porous table member are located in such a relationship that as one moves on a path of travel in a direction from the first station to the second station, the amount of gas flow in the zones is generally reduced. It is provided, however, that some of the contiguous zones of gas flow have the same gas flow therein to define a larger area. This larger area of same gas flow zones is never larger in size than the object to be moved thereover. A gas is flowed through the porous table member to float the object to be moved. The object is placed on the porous table at the first station. The movement of the gas through the various zones of the porous table member defining the first station floats the object at the first station. The object is released at the first station to permit the object to move from the first station to the second station. The movement is accomplished because different portions of the object are supported by different areas of differing gas flows. Such action causes the object to tip front end downwardly in the area of lowest gas flow and thereby be moved over the porous table member to the second station.

The object is moved from the first station to the second station because the leading edge of the article is always supported over an area of lower gas supply than the trailing edge of the object. This action causes the object to stay in a canted position with its front end down thereby using the force generated on the object's surface engaged by the gas to propel the same toward and into the second station.

The plurality of zones of gas flow may be established by many different methods. For example, uniformly sized units of surface area may be defined in the table member and a varying number of uniformly sized holes be formed in the various units of surface area so that different units of surface area have different amounts of gas flowing therethrough. Alternatively, unit sized areas may be defined and different diameter holes be formed in each of the units of surface area so that there are varying amounts of air flowing through various units of surface area. As still another alternative, the table member may be divided into various bands of gas flow. These various bands may have uniformly sized and spaced openings placed therein, with the number of openings per unit area varying with the different bands. The band nearest the first station will have a higher density of openings than the band nearest the second station.

The method of this invention may also be carried out by establishing more than a single first station. In this case, the method envisions a plurality of first stations which permit movement of an object from any one of the first stations to the second station.

The method of this invention has particular utility in the glass handling field. The method may be used to move sheets of glass from a first station over a porous table to a second station at which two edges of the glass sheet are accurately located.

BRIEF DESCRIPTION OF THE DRAWINGS

FIG. 1 is a plan view of a porous table member over which the method of my invention for moving objects is graphically depicted.

FIGS. 2 through 10 are graphical representations of how one forms uniformly sized holes in a unit surface area to provide various gas flow rates through that unit area.

FIG. 11 is a graphical presentation of how the method of this invention is used to move glass sheets to a glass processing line which forms the glass sheet into an automotive glass product such as a rear back lite.

FIG. 12 is a plan view of alternate embodiment of a porous table member over which the method of this invention can be practiced.

DESCRIPTION OF THE PREFERRED EMBODIMENTS

In FIG. 1 there is shown in plan view an air float table member generally identified by the numeral 10. As is well known to those skilled in the art, the air float table has associated therewith a gas plenum below a top surface 12 of the table 10. The plenum would also have associated therewith a source for developing a pressurized gas such as an air pump or fan. Since the general construction of pressurized gas supplying devices and plenums formed below a porous surface are well known in the art, no further discussion thereof will be undertaken herein. If air is used, it can be used with a pressure in the range of one-half inch to ten inches of water column.

The porous table member 10 has a pair of first stations each generally identified by the numeral 20. The width of each of these stations is shown by the width of arrow A in each station. An object 30 is shown in each of the first statons. Note that the object may be placed anywhere in the station thus allowing the structure for carrying out this glass placement operation to be simple in design.

The method of this invention is designed to convey the object 30 from either of the first stations 20 to a single second station generally identified by the numeral 40 in the drawings. This second station is in the upper left hand corner of the drawing of FIG. 1. As shown in the drawing, an object 30 is located in the second station 40 so that edges 30a and 30b thereof are held against walls 42 and 44, respectively defining the left hand and upper corners of the second station 40.

In accordance with the teachings of one embodiment of the method of this invention, the objects 30 are transported from either of the first stations 20 to the second station 40 by a gas floatation method which employs areas of different gas floatation density. With reference to FIG. 1, it will be seen that areas of the porous float table member 10 have various areas with numerals ranging from 8 to ½ labelled thereon. These different numerals represent a relative gas floatation density or porosity of the table in the particular area. The establishments of various areas in this embodiment may be best understood by reference to FIGS. 2 through 10. In this embodiment, one lays out on the table 10 a plurality of equally sized units of surface area. In this case, a unit size of surface area is selected as one square inch. A plurality of uniformly sized holes are drilled in each equally sized unit of surface area or in a location along the edge of contiguous unit sized surface areas.

In accordance with a preferred embodiment, uniformly sized holes 50 in the one square inch sized units of surface area are 1/16th inch in diameter. These holes are formed in such a manner that the openings of the holes to the top of the table member 10 are perpendicular to the top surface 12 of the table member.

In order to attain an area of the table 10 having equally sized units of one-half unit of air distribution, holes may be drilled in accordance with a predetermined format in each equally sized unit of surface area. This is best depicted in FIG. 2. In FIG. 2, an equal sized unit 54 has two holes 50 formed in opposite corners thereof. Since only one-quarter of each of the two holes 50 lies within the unit area 54, that unit area 54 has a one-half unit of air distribution.

FIG. 3 depicts a unit of surface area 54 having holes 50 formed at all four corners thereof. Since each of the corner holes adds one-quarter unit of air distribution, the total for this unit would be one unit of air distribution.

FIG. 4 shows holes 50 at the four corners and one in the center of the unit 54 of surface area. Thus, this unit of surface area shown in FIG. 4 has a value of two gas flow units.

FIG. 5 has holes 50 on the four corners and the center of the unit 54 of surface area. The unit of surface area also has openings 50 on two edges thereof. The openings at the corners each contribute one-quarter unit of gas volume, the one in the center one whole unit, and the two at each lateral edge each one-half unit of gas pressure so that the unit of surface area 54 shown in FIG. 5 has a total value of three units of gas pressure.

It may be easily understood now that FIG. 6 depicts four units of gas pressure, FIG. 7 depicts five units of gas pressure, FIG. 8 depicts six units of gas pressure, FIG. 9 depicts seven units of gas pressure and FIG. 10 depicts eight units of gas pressure.

These individual units of equally sized surface area are laid out so that a plurality of contiguous units of the same gas pressure define larger areas of generally uniform gas pressure. The larger areas of generally the same gas pressure are outlined in FIG. 1 of the drawings and have associated therewith the large numeral which indicates the general gas pressure associated with a particular area. The areas are not larger than the object 20 to be moved thereover. This is apparent in the drawings in both of the first stations 20 as the object 30 to be moved over the table 10 overlies areas having different gas pressure densities.

Another factor that is easily understood from FIG. 1 is that the areas of gas support density decrease from the first stations 20—20 to the second station 40. In the case illustrated in FIG. 1, the right hand first station 20 has gas support densities as high as eight, the left hand first station has gas densities as high as five, and the second station has gas densities as low as one-half. An object 30 placed in the first station 20 will lie over at least two areas of different gas support density. The higher gas support density will tip the object so that its leading edge is down, that is the edge supported in the lowest gas density area. This tipping action will permit exhausting of gas along the rear edge of the object 30 when it is released at the first station 20. After the object has been released in the station, it will glide over the top surface 12 of the table 10 along the path generally defined by arrows X and Y in FIG. 1 until the glass comes to rest with its edges engaging the walls 42 and 44 in the second station 40. These walls may have associated therewith a protective material so that the edges of the object are protected. This movement of an object will occur as long as the areas of equal gas density on the table 10 are not larger than the object to be moved and that the areas of gas density generally decrease in density from the first stations 20 to the second station 40.

In another alternate embodiment of the method of this invention, it would not be necessary to place uniform size holes in each unit size of surface area as described above. One may place larger sized holes centrally in each of the unit size areas to accomplish the same purpose. In other words, a small centrally located hole would give a certain unit of air pressure over that unit of surface area whereas larger and larger openings would give higher and higher units of air pressure over the same unit size of area. In such a case, the size of opening varies, not the number of openings per unit of area. In this embodiment, once again the area over which a particular sized hole is made should not exceed the size of the object to be transported and the size of openings per unit area should decrease from the first station 20 to the second station 40.

Reference is made to FIG. 11 of the drawings to show how the method of this invention may be used in commercial glass handling operations. In this situation, two first stations are employed to direct two streams of glass brackets to an unloading station 40. One stream of glass brackets may be tinted glass and the other stream of glass brackets may be clear glass. After the glass has been moved to the second station 40, it may be picked up at that station because of its accurate location of the two edges thereof as previously described, and transferred by mechanical means to a cutting station. At the cutting station, the shape is cut in the glass. Thereafter, the glass sheet is transferred to a stripping station with the excess glass is removed, a pair of grind statons where edges of the glass product are ground, and an inspection station and thence to an unloading station.

FIG. 12 is a plan view of a float table 110 in accordance with still another embodiment of our invention. In this particular embodiment, two first stations 120—120 feed a single second station 140. The construction of the table is similar to that discussed in FIG. 1 other than the table is divided into a plurality of bands of gas zones which get away from a block type layout. In this situation, the bands may have individual unit sized areas of surface area having gas supporting pressure units such as discussed above in regard to FIGS. 2 through 10. Alternatively, the gas pressure units may be formed by varying the size of holes in the surface of the table, rather than varying the number of holes per unit of surface area.

There has been disclosed herein a method for transporting an object from a first station to a second station. Those skilled in the art, after reading this specification, will have many modifications of this invention which fall within true spirit and scope thereof. It is intended that all such modifications be included within the scope of the appended claims.

What I claim is:

1. A method of moving an object which is floatable on a cushion of gas from a first station to a second station, which method comprises the steps of:

establishing a plurality of zones of gas flow by passing a gas upwardly through a porous table member, the amount of gas flow in each said zone being controlled by the porosity of said zone of said table member, the greater the porosity of said zone, the greater the amount of gas flow in said zone;

locating said zones of said porous table member in such a location that on a path of travel in a direction from said first station to said second station the amount of gas flow in the zones is generally reduced, provided, however, that many of said zones are contiguous and of the same gas flow to define a larger area, said larger area being smaller in size than the object to be moved;

flowing a gas through said porous table member to float the object to be moved thereover;

placing the object on said porous table at said first station, the movement of gas through the porous table member floating the object;

releasing the object at said first station to permit said object to move from said first station to said second station because different portions of said object are supported by different areas of differing gas flows which causes the object to tip front end downwardly in the area of lowest gas flow and thereby be moved over said porous table member to said second station.

2. The method of claim 1 wherein said plurality of zones of gas flow are established by:

dividing a top of said table member into a plurality of equally sized units of surface area; and forming uniform sized holes in each of said units of surface area in such a manner that the openings of said holes to said top of said table member are perpendicular to said top, the number of holes in each unit of surface area being largest at said first station and decreasing to be the lowest at said second station, many of said zones in said first and second stations and on said path of travel therebetween being contiguous and of the same gas flow to define a larger area, which larger area is not larger than the object to be moved.

3. The method of claim 2 wherein:

each unit of surface area is a aquare; and each unit of surface area has from one-half to eight holes of uniform size therein.

4. The method of claim 3 wherein:

the gas used is air under pressure of from about one-half inch to ten inches of water column, the object to be moved is a sheet of glass, each unit of surface area is one square inch; and the diameter of the holes formed in said table member is 1/16of an inch.

5. The method of claim 1 wherein: said plurality of zones of gas flow are established by:

dividing a top of said table member into a plurality of bands of gas flow; and forming uniformly sized and shaped holes in each band of gas flow in such a manner that the openings of said holes to said top of said table member are perpendicular to said top, the number of holes per unit of dimension for said bands of gas flow being greatest at said first station and decreasing in a gradual manner to be the lowest at said second station.

6. The method of claim 1 wherein: said plurality of gas flow zones are established by: dividing a top of said table member into a plurality of equally sized units of surface area; and forming holes in each of said units of surface area in such a manner that the openings of said holes to said top of said table member are perpendicular to said top, the permeability of each of said units of surface area to the flow of gas therethrough being controlled by the number and size of said holes formed in each of said units of surface area, the permeability per unit of surface area being the largest at said first station and decreasing to be the least at said second station, many of said zones in said first and said second stations and on said path of travel therebetween being contiguous and of the same permeability to define a larger area, which larger area is not larger than the object to be moved.

7. A method of moving an object which is floatable on a cushion of gas from one of a plurality of first stations to a second station, which method comprises the steps of:

establishing a plurality of zones of gas flow by passing a gas upwardly through a porous table member, the amount of gas flow in each said zone being controlled by the porosity of said zone of said table member, the greater the porosity of said zone the greater the amount of gas flowing in said zone;

locating said zones of said porous table member in such a location that on a path of travel from any one of said plurality of first stations to said second station the amount of gas flow in the zone is generally reduced, provided, however, that many of said zones are contiguous and of the same gas flow to define a larger area, said larger area being smaller in size than the object to be moved;

flowing a gas through said porous table member to float the object to be moved thereover;

placing the object on said porous table at one of said plurality of first stations, the movement of gas through said porous table member floating the object;

releasing the object at said one of said plurality of first stations to permit said object to move from said first station to said second station because different portions of said object are supported by different areas of differing gas flows which causes the object to tip front end downwardly in the area of lowest gas flow and thereby to be moved over said porous table member to said second station; and placing other objects at said other of said plurality of first work stations whereby they also may be moved over said porous table to said second station.

8. The method of claim 7 wherein: said plurality of zones of gas flow are established by:

dividing a top of said table member into a plurality of equally sized units of surface area; and forming uniform sized holes in each of said units of surface area in such a manner that the openings of said holes to said top of said table member are perpendicular to said table member, the number of holes in each unit of surface area being largest at said plurality of first stations and decreasing to be the lowest at said second work station, many of said zones in said first plurality of work stations and said second work station and on said path of travel therebetween being contiguous and of the same gas flow to define larger areas, which larger areas are not larger than the object to be moved.

9. The method of claim 8 wherein:

each unit of surface area is a square and, each unit of surface area has from one-half to eight holes of uniform size formed therein.

10. The method of claim 9 wherein: the gas used is air under pressure in the range of from one-half inch to ten inches of water column;

the object to be moved is a glass sheet;

each unit of surface area is one square inch; and the diameter of said holes formed in said table member is one-sixteenth inch.

11. The method of claim 7 wherein: said plurality of zones of gas flow are established by:

dividing a top of said table member into a plurality of bands of gas flow; and forming uniformly sized and spaced holes in each band of gas flow in such a manner that the openings of said holes to said top of said table member are perpendicular to said top, the number of holes per unit of dimension for said band of gas flow being greatest at said plurality of first stations and decreasing in a gradual manner to be the lowest at said second work station.

12. The method of claim 7 wherein: said plurality of gas flow zones are established by:

dividing a top of said table member into a plurality of equally sized units of surface area; and forming holes in each of said units of surface area in such a manner that the openings of said holes to said top of said table member are perpendicular to said top, the permeability of each of said units of surface area to the flow of gas therethrough being controlled by the number and size of said holes formed in each of said units of surface area, the permeability per unit of surface area being the largest at each of said plurality of first stations and decreasing to be the least at said second station, many of said zones in said plurality of first stations and at second station and on said path of travel therebetween being contiguous and of the same permeability to define larger areas, which said larger areas are not larger than the object to be moved.

* * * * *